United States Patent
Feng (10) Patent No.: US 12,250,490 B2
(45) Date of Patent: Mar. 11, 2025

(54) METHOD FOR PROCESSING VIDEO, TERMINAL, AND STORAGE MEDIUM

(71) Applicant: HANGZHOU HIKVISION DIGITAL TECHNOLOGY CO., LTD., Zhejiang (CN)

(72) Inventor: Zhongjian Feng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 357 days.

(21) Appl. No.: 17/629,245

(22) PCT Filed: Jul. 21, 2020

(86) PCT No.: PCT/CN2020/103257
§ 371 (c)(1),
(2) Date: Jan. 21, 2022

(87) PCT Pub. No.: WO2021/013147
PCT Pub. Date: Jan. 28, 2021

(65) Prior Publication Data
US 2022/0256099 A1    Aug. 11, 2022

(30) Foreign Application Priority Data
Jul. 23, 2019 (CN) .......................... 201910668099.5

(51) Int. Cl.
*H04N 5/262* (2006.01)
(52) U.S. Cl.
CPC ................................. *H04N 5/2628* (2013.01)

(58) Field of Classification Search
CPC .................................................. H04N 5/2628
See application file for complete search history.

(56) References Cited

U.S. PATENT DOCUMENTS

2004/0012621 A1 * 1/2004 Kaneko ................. G06F 16/748
                                                           707/E17.028
2005/0151885 A1    7/2005 Choi
(Continued)

FOREIGN PATENT DOCUMENTS

| CN | 1627790 A | 6/2005 |
|---|---|---|
| CN | 102984595 A | 3/2013 |

(Continued)

OTHER PUBLICATIONS

Extended European search report of counterpart European application No. 20842927.4 issued on Aug. 8, 2022.
(Continued)

*Primary Examiner* — Mishawn N. Hunter
(74) *Attorney, Agent, or Firm* — Knobbe Martens Olson & Bear LLP (57) ABSTRACT

Provided is a method for processing a video. The method includes: superimposing a transparent image layer on a video playback window; acquiring a first image by capturing images from a video played in the video playback window in response to acquiring a specified region to be enlarged and displayed in the video playback window; acquiring a second image by clipping the first image based on the specified region, wherein the second image comprises the specified region; and enlarging and displaying the second image on the transparent image layer.

17 Claims, 6 Drawing Sheets

(56) References Cited

U.S. PATENT DOCUMENTS

| | | | |
|---|---|---|---|
| 2010/0313129 A1* | 12/2010 | Hyman | G06F 16/9577 715/781 |
| 2012/0017142 A1 | 1/2012 | Nagao | |
| 2016/0269677 A1 | 9/2016 | Lee et al. | |
| 2017/0178289 A1 | 6/2017 | Zhang et al. | |
| 2018/0018079 A1* | 1/2018 | Monastyrshyn | H04N 21/44008 |

FOREIGN PATENT DOCUMENTS

| | | | |
|---|---|---|---|
| CN | 105578275 A | 5/2016 |
| CN | 106504280 A | 3/2017 |
| CN | 107465953 A | 12/2017 |
| CN | 107665139 A | 2/2018 |
| CN | 108008991 A | 5/2018 |
| CN | 109005446 A | 12/2018 |
| CN | 109963200 A | 7/2019 |
| CN | 111355998 A | 6/2020 |
| JP | H06350892 A | 12/1994 |
| JP | H1070303 A | 3/1998 |
| TW | 281741 B | 7/1996 |
| WO | 2012021246 A2 | 2/2012 |
| WO | 2014183348 A1 | 11/2014 |

OTHER PUBLICATIONS

International search report of PCT application No. PCT/CN2020/103257 issued on Oct. 13, 2020.
First office action of Chinese application No. 201910668099.5 issued on Mar. 3, 2021.
Second office action of Chinese application No. 201910668099.5 issued on Oct. 11, 2021.

* cited by examiner

METHOD FOR PROCESSING VIDEO, TERMINAL, AND STORAGE MEDIUM

This application a U.S. national stage of international application No. PCT/CN2020/103257, filed on Jul. 21, 2020, which claims priority to Chinese Patent Application No. 201910668099.5, filed on Jul. 23, 2019 and entitled "METHOD AND APPARATUS FOR PROCESSING VIDEO," the disclosures of which are herein incorporated by reference in their entireties.

TECHNICAL FIELD

The present disclosure relates to the field of video processing technologies, and in particular, relates to a method for processing a video, a terminal, and a storage medium.

BACKGROUND

With the development of browsers, more and more users watch videos over the browsers. In the process of watching videos, the users may have to enlarge and display partial regions of a video image, and thus a method for processing a video is urgently desired.

SUMMARY

Embodiments of the present disclosure provide a method and apparatus for processing a video, a terminal and a storage medium. The technical solutions of the present disclosure are as follows.

In one aspect, a method for processing a video is provided. The method includes:
  superimposing a transparent image layer on a video playback window;
  acquiring a first image by capturing images from a video played in the video playback window in response to acquiring a specified region to be enlarged and displayed in the video playback window;
  acquiring a second image by clipping the first image based on the specified region, wherein the second image includes the specified region; and
  enlarging and displaying the second image on the transparent image layer.

In a possible embodiment, acquiring the first image by capturing images from the video played in the video playback window includes:
  acquiring one first image by capturing images from the video for every preset time period;
  acquiring the second image by clipping the first image based on the specified region includes:
  acquiring, each time one first image is acquired, one second image by clipping the one first image currently acquired based on the specified region; and
  enlarging and displaying the second image on the transparent image layer includes:
  updating, each time one second image is acquired, the second image currently displayed on the transparent image layer to the one second image currently acquired or keeping the second image currently displayed unchanged, based on the one second image currently acquired.

In a possible embodiment, updating the second image currently displayed on the transparent image layer to the second image currently acquired or keeping the second image currently displayed unchanged, based on the currently acquired second image includes:
  acquiring a similarity degree between the second image currently acquired and the second image currently displayed; and
  updating the second image currently displayed to the second image currently acquired in the case that the similarity degree is less than a preset threshold; or
  keeping the second image currently displayed unchanged in the case that the similarity degree is greater than or equal to the preset threshold.

In a possible embodiment, prior to superimposing the transparent image layer on the video playback window, the method further includes:
  enabling an enlarging function in response to receiving an enabling instruction of the enlarging function, wherein the enlarging function is configured to enlarge and display any region of the video in the video playback window.

In a possible embodiment, upon enlarging and displaying the second image on the transparent image layer, the method further includes:
  disabling an enlarging function in response to receiving a disabling instruction of the enlarging function; and
  deleting the transparent image layer.

In a possible embodiment, prior to superimposing the transparent image layer on the video playback window, the method further includes:
  playing the video in the video playback window over a video player of a browser.

In a possible embodiment, a size of the transparent image layer is equal to a size of the video playback window, and a displayed size of the second image is equal to the size of the transparent image layer.

In another aspect, an apparatus for processing a video is provided. The apparatus includes:
  a superimposing module, configured to superimpose a transparent image layer on a video playback window;
  an image capturing module, configured to acquire a first image by capturing images from a video played in the video playback window in response to acquiring a specified region to be enlarged and displayed in the video playback window;
  a clipping module, configured to acquire a second image by clipping the first image based on the specified region, wherein the second image includes the specified region; and
  a displaying module, configured to enlarge and display the second image on the transparent image layer.

In a possible embodiment, the image capturing module is configured to acquire one first image by capturing images from the video for every preset time period;
  the clipping module is configured to acquire, each time one first image is acquired, one second image by clipping the one first image currently acquired based on the specified region; and
  the displaying module is configured to update, each time one second image is acquired, the second image currently displayed on the transparent image layer to the one second image currently acquired or keep the second image currently displayed unchanged, based on the one second image currently acquired.

In a possible embodiment, the displaying module is configured to:
  acquire a similarity degree between the second image currently acquired and the second image currently displayed; and update the second image currently displayed to the second image currently acquired in the case that the similarity degree is less than a preset threshold; or keep the second image currently displayed unchanged in the case that the similarity degree is greater than or equal to the preset threshold.

In a possible embodiment, the apparatus further includes:

a playing module, configured to play the video in the video playback window over a video player of a browser.

In a possible embodiment, the apparatus further includes:

an enabling module, configured to enable an enlarging function in response to receiving an enabling instruction of the enlarging function, wherein the enlarging function is configured to enlarge and display any region of the video in the video playback window.

In a possible embodiment, the apparatus further includes:

a disabling module, configured to disable an enlarging function in response to receiving a disabling instruction of the enlarging function, wherein the enlarging function is configured to enlarge and display any region of the video in the video playback window; and a deleting module, configured to delete the transparent image layer.

In a possible embodiment, a size of the transparent image layer is equal to a size of the video playback window, and a displayed size of the second image is equal to the size of the transparent image layer.

In still another aspect, a terminal is provided. The terminal includes one or more processors and one or more memories. The one or more memories are configured to store at least one instruction, and the one or more processors, when executing the at least one instruction stored in the one or more memories, are caused to perform the method for processing the video as described above.

In yet still another aspect, a non-temporary storage medium storing at least one instruction is provided. The at least one instruction is configured to, when executed by a processor, causes the processor to perform the method for processing the video as described above.

In yet still another aspect, a computer program product storing one or more instructions therein is provided. The one or more instructions, when executed by a processor of a terminal, cause the terminal to perform the method for processing the video as described above.

BRIEF DESCRIPTION OF THE DRAWINGS

For clearer descriptions of the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skilled in the art may still derive other drawings from these accompanying drawings without creative efforts.

DETAILED DESCRIPTION

For clearer descriptions of the purposes, technical solutions and advantages of the present disclosure, the technical solutions of the embodiments of the present disclosure are described clearly and completely hereinafter in combination with the accompanying drawings.

A transparent image layer is superimposed on a video playback window, such that a user may draw, on the transparent image layer, a specified region to be enlarged and displayed in the video playback window. A terminal may capture, based on the drawn specified region, images from a video played in the video playback window, then, clip a captured image based on the specified region, and finally, enlarge and display, on the transparent image layer, an image acquired by clipping based on the specified region, thereby achieving an effect of enlarging and displaying the image of the specified region may be achieved. That is, a function of enlarging and displaying the specified region of the video image may be realized, and because the method does not need to call any plug-in and is applicable to any browser, the applicability is improved.

In the related art, for satisfying needs of users for enlarging and displaying a partial region of a video image, generally, YUV data is acquired by calling a Netscape plugin application programming interface (NPAPI) or an ActiveX plug-in to decode video stream data, YUV data of a region is acquired by clipping the YUV data based on a region to be enlarged that is selected from a video, and an effect of enlarging and displaying the region is achieved by rendering the YUV data of the region. The YUV data refers to data in a YUV format. YUV is a color encoding format divided into three components: "Y" representing luminance (or luma), that is, a gray value, and "U" and "V" representing chrominance (or chroma) and being configured to describe a color and a saturation of an image and specify the color of a pixel. In the related art, a function of enlarging and displaying the partial region of the video image is realized by calling an NPAPI or an ActiveX plug-in and clipping decoded YUV data. However, only Internet Explorer (IE) browsers in mainstream browsers on the current market support the NPAPI or the ActiveX plug-in, and other browsers, due to incapability of calling the NPAPI or the ActiveX plug-in, fail to implement the functions of enlarging and displaying the partial region of the video image, resulting in poor applicability.

The technical solutions of the embodiments of the present disclosure achieve at least the following beneficial effects.

Figure 1:
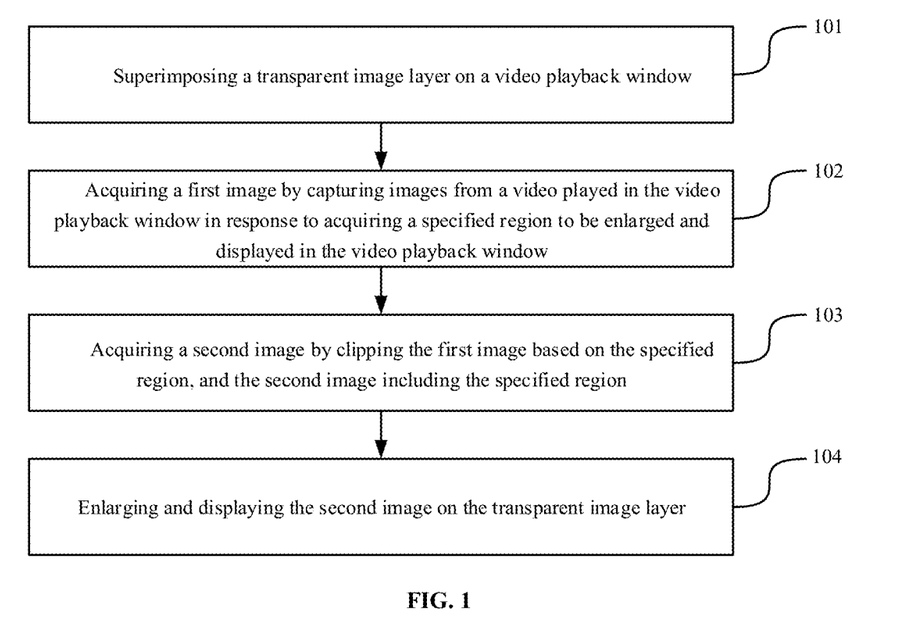
FIG. 1 is a flowchart of a method for processing a video according to an embodiment of the present disclosure.

FIG. 1 is a flowchart of a method for processing a video according to an embodiment of the present disclosure. Referring to FIG. 1, the method includes the following processes.

In S101, a transparent image layer is superimposed on a video playback window.

Upon being superimposed on the video playback window, the transparent image layer may be configured to implement drawing of a region and displaying of an image.

In S102, a first image is acquired by capturing images from a video played in the video playback window in response to acquiring a specified region to be enlarged and displayed in the video playback window.

The image capture is further referred to as a screen shooting. The screen shooting refers to shooting an entire video image of the screen in the video playback window. A size of the first image may be equal to a size of the video playback window.

In S103, a second image is acquired by clipping the first image based on the specified region, and the second image includes the specified region.

A partial image acquired by clipping the first image based on the specified region acts as the second image.

In S104, the second image is enlarged and displayed on the transparent image layer.

Because the second image is the image of the specified region, the second image is enlarged and displayed on the transparent image layer. That is, the specified region in the video is enlarged and displayed.

In the method according to the embodiment of the present disclosure, a transparent image layer is superimposed on a video playback window, such that a user may draw, on the transparent image layer, a specified region to be enlarged and displayed in the video playback window. A terminal may capture, based on the drawn specified region, images from a video played in the video playback window, then, clip a captured image based on the specified region, and finally, enlarge and display, on the transparent image layer, an image acquired by clipping based on the specified region, thereby realizing an effect of enlarging and displaying the image of the specified region. That is, a function of enlarging and displaying the specified region of the video image may be implemented, and because the method does not need to call any plug-in and is applicable to any browser, the applicability is improved.

Figure 2:
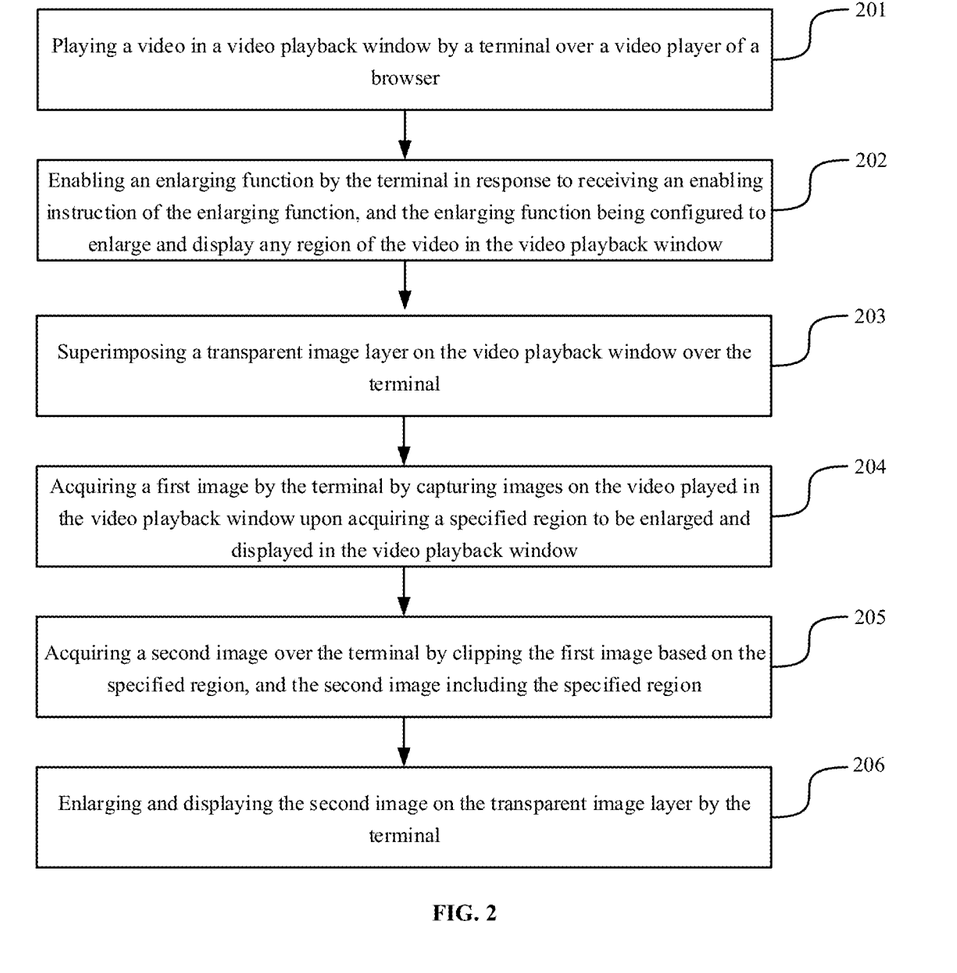
FIG. 2 is a flowchart of a method for processing a video according to an embodiment of the present disclosure.

FIG. 2 is a flowchart of a method for processing a video according to an embodiment of the present disclosure. Referring to FIG. 2, the method includes the following processes.

In S201, a terminal plays a video in a video playback window over a video player of a browser.

The browser may be any browser of an IE browser, a Firefox browser, a Chrome browser, an Edge browser, or a Safari browser. The browser is an application program configured to retrieve and display information resources on a world wide web. These information resources may be web pages, images, videos, or other content, and are marked by a uniform resource identifier. Users can conveniently browse related information over hyperlinks in the information resources.

In the embodiments of the present disclosure, the terminal may be installed with the browser, and play the video over a local video player in the browser. The local video player in the browser may also be referred to as a video tag and is configured to play a video file or a video stream. For example, the user may operate on the terminal, trigger the terminal to open the browser, and click a video in a web page on the browser to play the video on a web (the web page) terminal over the local video player in the browser.

By displaying the video over the local video player in the browser, where the user has a need of enlarging and displaying a partial region of a video image in the process of watching the video, the terminal may satisfy the need of the user based on the method for processing the video in the embodiments of the present disclosure.

In S202, the terminal enables an enlarging function in response to receiving an enabling instruction of the enlarging function, and the enlarging function is configured to enlarge and display any region of the video in the video playback window.

The enlarging function is enlarging the partial region of the video image, to achieve an effect of overspreading the window. The enlarging function may also be referred to as an electronic enlarging function.

In the embodiments of the present disclosure, a switch for the enlarging function may be provided in the video playback window. The enabling instruction may be triggered via an enabling operation of the user on the switch. The switch may be in a slide button fashion. The user may slide the slide button to the "on" position, to set the switch to be in an enabled state and trigger the enabling instruction of the enlarging function, such that the terminal may receive the enabling instruction.

In some embodiments, the terminal may set a flag (flag bit) to mark the enabled state and a disabled state of the enlarging function. In the case that the terminal enables the enlarging function, the flag is set to 1 to indicate that the enlarging function is in the enabled state; and in the case that the terminal disables the enlarging function, the flag is set to 0 to mark that the enlarging function is in the disabled state. It can be understood that 1 and 0 are only an example, and the terminal may further mark with other values.

The enlarging function is implemented by performing subsequent processes in response to enabling the enlarging function upon receipt of the enabling instruction is received. This provides a fashion for triggering video processing.

In S203, the terminal superimposes a transparent image layer on the video playback window.

In the embodiments of the present disclosure, in response to enabling the enlarging function, the terminal may create a transparent canvas image layer, and superimpose the image layer on the video playback window. In some embodiments, a size of the transparent image layer is equal to a size of the video playback window. In this case, the terminal superimposes the transparent image layer on the video playback window at a ratio of 1:1. Pixels in the transparent image layer show a transparent effect and may be configured to realize drawing of a video region and displaying of the image.

Figure 3:
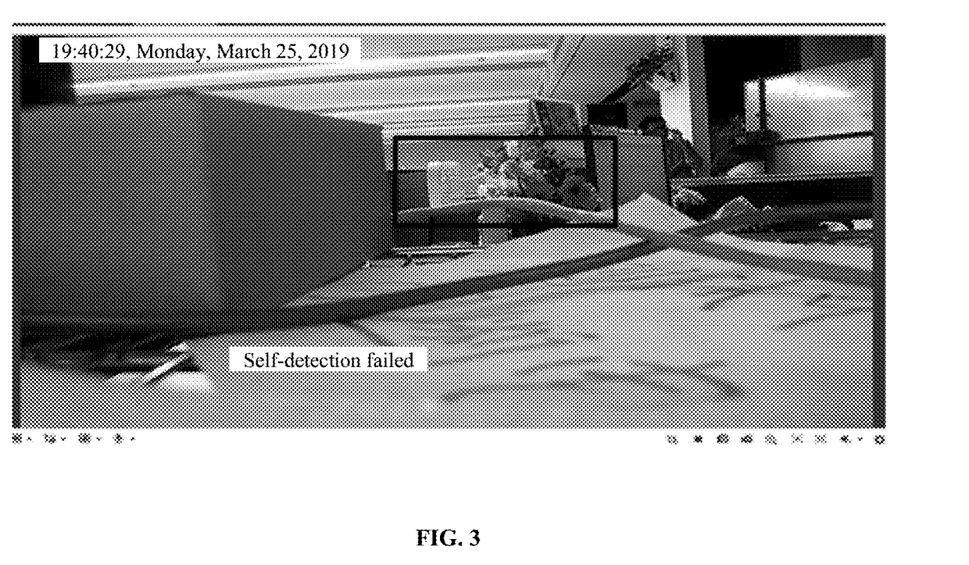
FIG. 3 is a schematic diagram of a video playback window according to an embodiment of the present disclosure.

Because the image layer is a transparent image layer, the user can accurately draw, on the transparent image layer, a region to be enlarged and displayed in the process of watching the video. For example, to focus on a certain region in the video, the user may draw a frame of the region in the transparent image layer on the video playback window based on the video played in the video playback window. FIG. 3 shows a schematic diagram of a video playback window. FIG. 3 is an original video playback window before enlarging, and a rectangular frame in FIG. 3 is a region drawn by the user and to be enlarged.

In S204, the terminal acquires a first image by capturing images from the video played in the video playback window upon acquiring a specified region to be enlarged and displayed in the video playback window.

In the embodiments of the present disclosure, for the method for acquiring the specified region, the user may draw, on the transparent image layer in S203, the specified region to be enlarged and displayed in the video playback window, such that the terminal may acquire the specified region drawn on the transparent image layer. The terminal may further superimpose another transparent image layer on the video playback window for the user to draw the specified region, such that the terminal may acquire the specified region drawn on the another transparent image layer. It can be understood that the terminal may further acquire the specified region in another fashion than the transparent image layer, and the fashion for acquiring the specified region is not limited in the embodiments of the present disclosure.

In response to acquiring the specified region, the terminal may capture images from the video played in the video playback window, thereby capturing the video image presented in the video playback window and acquiring an image corresponding to the video, namely, the first image. A size of the first image is equal to the size of the video playback window.

In some embodiments, acquiring, by the terminal, the first image by capturing images from the video played in the video playback window includes: acquiring a plurality of first images by capturing images from the video for every preset time period.

The terminal may perform the image capture on the video for every preset time period, for example, every 1 second, and one image may be acquired upon each image capture. Specifically, the terminal may enable a timer and capture the image from the video at each fixed time point, for example, $1^{st}$ second, $2^{nd}$ second, $3^{rd}$ second, ..., $n^{th}$ second, ..., and n is a positive integer.

The image is capture from the video played in the video playback window for every preset time period, and the first image may be updated for every preset time period.

In S205, the terminal acquires a second image by clipping the first image based on the specified region, and the second image includes the specified region.

In the embodiments of the present disclosure, the specified region acquired by the terminal is also a specified region of the first image. The terminal may clip the captured first image based on the specified region. Specifically, the terminal may clip a partial image of the specified region in the first image along a frame of the specified region, and act the partial image as the second image. Because the second image is acquired by clipping the first image, a size of the second image is less than the size of the first image.

Corresponding to the terminal performs the image capture for every preset time period in S204, acquiring, by the terminal, the second image by clipping the first image based on the specified region in S205 includes: acquiring, each time one first image is acquired, the second image by clipping the one first image currently acquired based on the specified region.

Each time one first image is captured via S204, the terminal may acquire one second image by clipping the one first image currently captured. By clipping the image captured for every preset time period, the second image may be updated for every preset time period.

In S206, the terminal enlarges and displays the second image on the transparent image layer.

In the embodiments of the present disclosure, the terminal may enlarge and display the clipped second image on the transparent image layer. That is, a displayed size of the second image on the transparent image layer is greater than an original size of the second image.

In some embodiments, the displayed size of the second image is equal to the size of the transparent image layer. Where the size of the transparent image layer is equal to the size of the video playback window, the displayed size of the second image is equal to the size of the video playback window. That is, a width and a length of the second image are consistent with a width and a length of the video playback window, such that an effect of overspreading the entire video playback window by the second image for displaying may be achieved. Because the original size of the second image before being displayed is less than the size of the first image, that is, less than the size of the video playback window, overspreading the entire video playback window by the second image for displaying is enlarging and displaying the second image, and is enlarging and displaying the specified region in the video because the second image is an image in the specified region.

Figure 4:
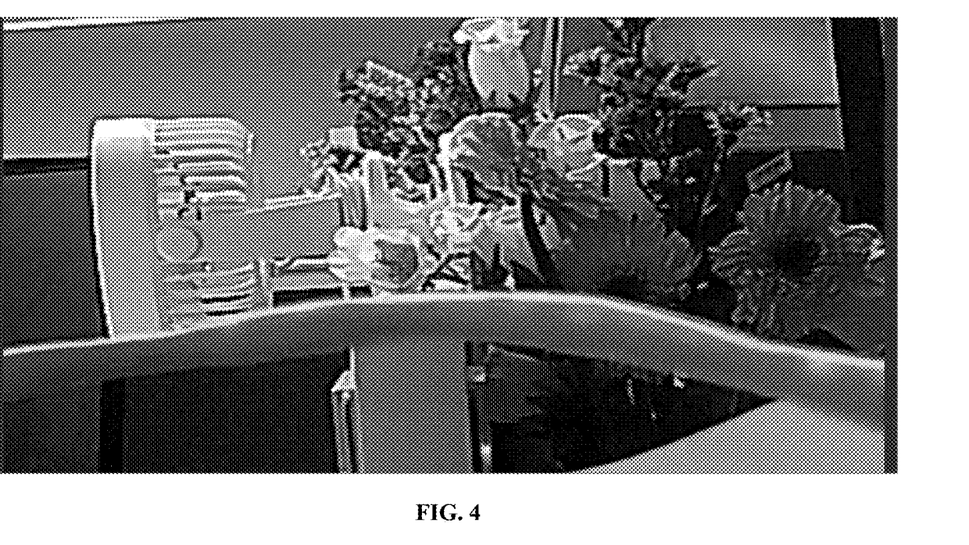
FIG. 4 is a schematic diagram of a video playback window according to an embodiment of the present disclosure.

FIG. 4 is a schematic diagram of a video playback window. FIG. 4 shows an effect of enlarging a region corresponding to the rectangular frame in FIG. 3. It can be known from FIG. 4 that the entire video playback window is overspread by the region.

Corresponding to capturing the image by the terminal for every preset time period in S204, displaying, by the terminal, the second image on the transparent image layer in S206 includes: updating, each time one second image is acquired, the second image currently displayed on the transparent image layer to the one second image currently acquired, or keeping the second image currently displayed unchanged, based on the one currently acquired second image.

Each time one first image is captured via S204, the terminal acquires one second image by clipping the one first image currently captured via step 205, and displays a second image currently clipped by S206, thereby updating an second image enlarged and displayed for every preset time period. The time period is the same as the time period of the image capture in S204.

In some embodiments, based on the second image currently acquired, updating the second image currently displayed on the transparent image layer to the second image currently acquired, or keeping the second image currently displayed unchanged includes: acquiring a similarity degree between the second image currently acquired and the second image currently displayed; and updating the second image currently displayed to the second image currently acquired in the case that the similarity degree is less than a preset threshold; or keeping the second image currently displayed unchanged in the case that the similarity degree is greater than or equal to the preset threshold.

Because the video image changes slightly or does not change within the preset time period, a second image currently acquired may shows a relatively large similarity degree with the second image currently displayed. The terminal may first calculate the similarity degree between the second image currently acquired and the second image currently displayed. Where the similarity degree is relatively small, an image in the specified region changes greatly, and in this case, the terminal may update the second image currently displayed. Where the similarity degree is relatively great, the image in the specified region changes slightly, and in this case, the terminal may directly keep the second image currently displayed unchanged.

Each time one second image is acquired, the one second image currently acquired and the second image currently displayed are compared, such that the terminal may determine, based on the similarity degree, whether to update, thereby reducing resources consumed in updating.

In some embodiments, upon displaying the second image on the transparent image layer, the method further includes: disabling the enlarging function in response to receiving a disabling instruction of the enlarging function; and deleting the transparent image layer.

Similar to the enabling instruction in S202, the disabling instruction may be triggered over a disabling operation of the user on the switch of the enlarging function. For example, the user may slide the slide button corresponding to the switch to the "off" position, to set the switch to be in an off state, and trigger the disabling instruction of the enlarging function, such that the terminal may receive the disabling instruction. Referring to the description of the flag (flag bit) in S202, upon disabling the enlarging function, the terminal may set the flag (flag bit) to 0. In response to receiving the disabling instruction, the terminal may get that the user does not need the enlarging function any more, and thus the transparent image layer created this time is not need to use. Therefore, the terminal may close the created image layer upon disabling the enlarging function. In this way, a certain quantity of memory resources may be released. Upon deleting the transparent image layer, the terminal may stop enlarging and displaying the second image, resume normal playback of the video in the video playback window, and perform S202 to S206 to enlarge and display a partial region of a video image in the case that the enlarging function is enabled again.

Figure 5:
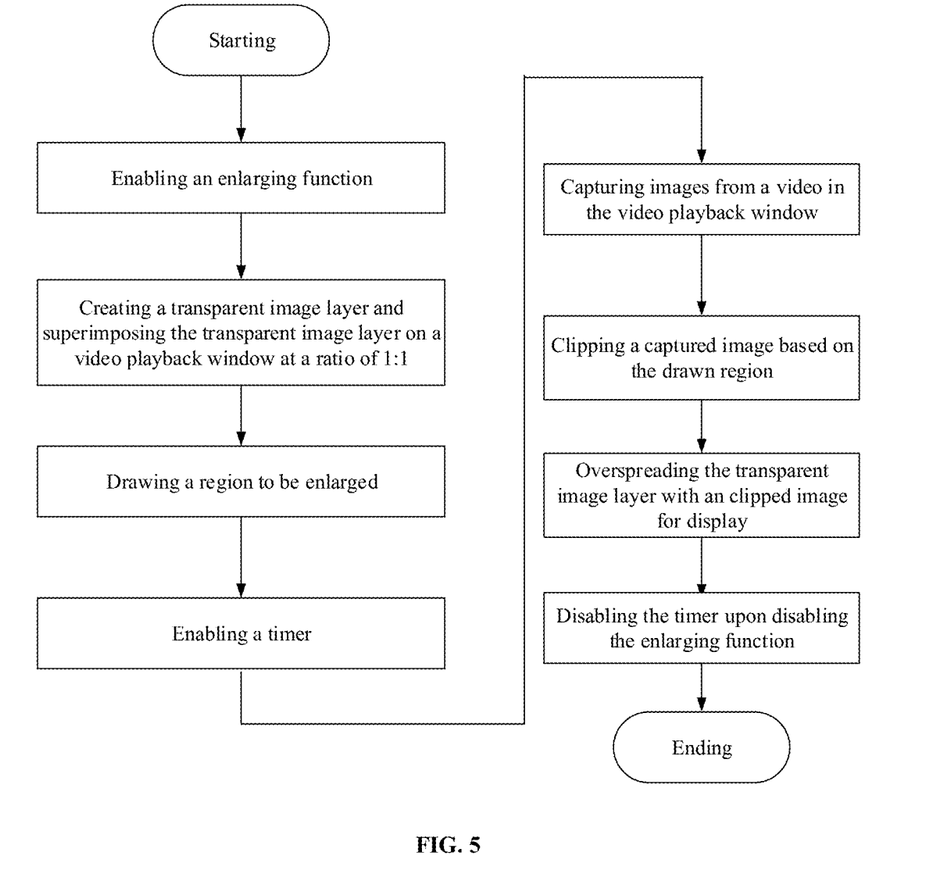
FIG. 5 is a flowchart of a method for processing a video according to an embodiment of the present disclosure.

FIG. 5 is a flowchart of a method for processing a video. As shown in FIG. 5, in response to enabling the enlarging function, the terminal may create the transparent image layer and superimpose the transparent image layer on the video playback window at a ratio of 1:1. The user may draw a region to be enlarged on the transparent image layer. The terminal may enable a timer and capturing images from the video in the video playback window, clip a captured image based on the drawn region, overspread the transparent image layer by a clipped image for displaying, and disable the timer where the enlarging function is disabled.

According to the above technical solutions, a local video player in a browser is configured to play a video; a transparent image layer is superimposed on a video playback window; an image in the video playback window is dynamically captured; a specific region is clipped from the image; and finally, the transparent image layer is overspread with a clipped image for displaying. Thus, regular refreshing may be realized. A problem that upon a video plug-in is disabled over the browser, a partial region in a video image cannot be enlarged in the case that the local video player in the browser is configured to play the video may be solved.

According to the method provided in the embodiments of the present disclosure, a transparent image layer with a same size as a video playback window is superimposed on the video playback window, such that a user may draw, on the transparent image layer, a specified region to be enlarged and displayed in the video playback window. A terminal may capture, based on the drawn specified region, images from a video played in the video playback window, then, clip a captured image based on the specified region, and finally, overspread the transparent image layer with an image acquired upon the clipping based on the specified region. Because the size of the transparent image layer is equal to the size of the video playback window, an effect of overspreading the transparent image layer with the image of the specified region may be achieved. That is, a function of enlarging and displaying the specified region of the video image may be implemented, and because the method does not need to call any plug-in and is applicable to any browser, the applicability is improved.

Figure 6:
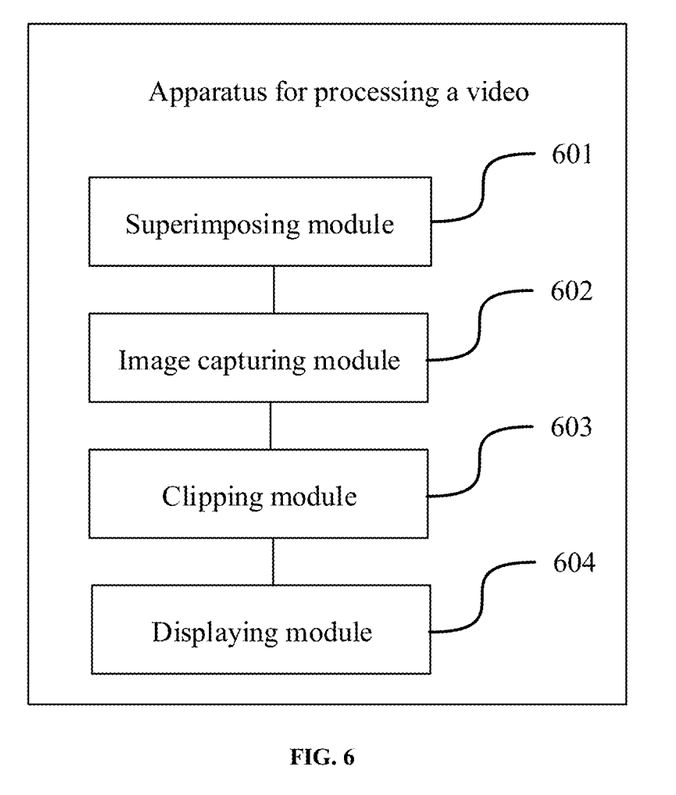
FIG. 6 is a schematic structural diagram of an apparatus for processing a video according to an embodiment of the present disclosure.

FIG. 6 is a schematic structural diagram of an apparatus for processing a video according to an embodiment of the present disclosure. Referring to FIG. 6, the apparatus includes:

a superimposing module 601, configured to superimpose a transparent image layer on a video playback window;

an image capturing module 602, configured to, upon acquiring a specified region to be enlarged and displayed in the video playback window, acquire a first image by capturing images from a video played in the video playback window;

a clipping module 603, configured to acquire a second image by clipping the first image based on the specified region, and the second image includes the specified region; and a displaying module 604, configured to enlarge and display the second image on the transparent image layer.

In some embodiments, the image capturing module 602 is configured to acquire one first image by capturing images from the video for every preset time period;

the clipping module 603 is configured to acquire, each time one first image is acquired, one second image by clipping the one first image currently acquired based on the specified region; and the displaying module 604 is configured to update, each time one second image is acquired, the second image currently displayed on the transparent image layer to the one second image currently acquired, or keep the second image currently displayed unchanged, based on the one currently acquired second image.

In some embodiments, the displaying module 604 is configured to:

acquire a similarity degree between the second image currently acquired and the second image currently displayed; and update the second image currently displayed to the second image currently acquired in the case that the similarity degree is less than a preset threshold; or keep the second image currently displayed unchanged in the case that the similarity degree is greater than or equal to the preset threshold.

In some embodiments, the apparatus further includes:

an enabling module, configured to enable an enlarging function in response to receiving an enabling instruction of the enlarging function, and the enlarging function is configured to enlarge and display any region of the video in the video playback window.

In some embodiments, the apparatus further includes:

a disabling module, configured to disable an enlarging function in response to receiving a disabling instruction of the enlarging function, and the enlarging function is configured to enlarge and display any region of the video in the video playback window; and a deleting module, configured to delete the transparent image layer.

In some embodiments, the apparatus further includes:

a playing module, configured to play the video in the video playback window over a video player of a browser.

In some embodiments, a size of the transparent image layer is equal to a size of the video playback window, and a displayed size of the second image is equal to the size of the transparent image layer.

According to the apparatus provided in the embodiments of the present disclosure, a transparent image layer is superimposed on a video playback window, such that a user may draw, on the transparent image layer, a specified region to be enlarged and displayed in the video playback window. A terminal may capture, based on the drawn specified region, images from a video played in the video playback window, then, clip a captured image based on the specified region, and finally, enlarge and display, on the transparent image layer, an image acquired by clipping based on the specified region, thereby realizing an effect of enlarging and displaying the image of the specified region. That is, a function of enlarging and displaying the specified region of the video image may be implemented, and because the method does not need to call any plug-in and is applicable to any browser, the applicability is improved.

It needs to be noted that in the case that the apparatus for processing a video provided in the foregoing embodiments processes the video, the division of the foregoing functional modules is only an example for description. In the actual application, the foregoing functions may be allocated to different functional modules as required. That is, the internal structure of the apparatus is divided into different functional modules, to complete all or some above functions. In addition, the apparatus for processing the video provided in the foregoing embodiments is a same concept as the embodiments of the method for processing a video, and a specific implementation process of the apparatus for processing the video may be described in the method embodiments, which are not repeated herein.

Figure 7:
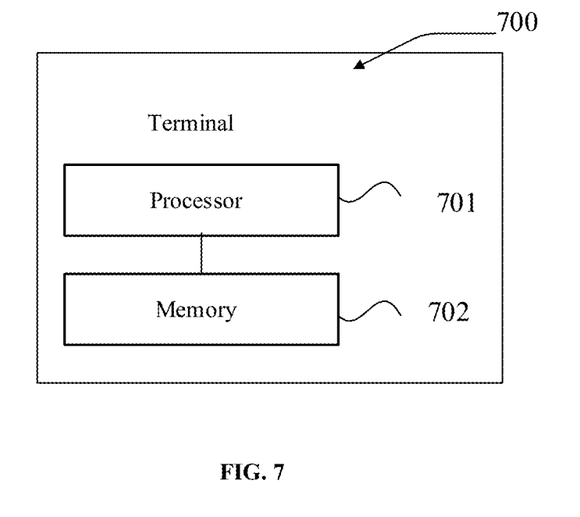
FIG. 7 is a schematic structural diagram of a terminal 700 according to an embodiment of the present disclosure.

FIG. 7 is a schematic structural diagram of a terminal 700 according to an embodiment of the present disclosure. The terminal 700 includes a processor 701 and a memory 702. The memory 702 is configured to store at least one instruction, and the processor 701, when executing the at least one instruction, is caused to perform a method for processing a video including:

superimposing a transparent image layer on a video playback window;

acquiring a first image by capturing images from a video played in the video playback window in response to acquiring a specified region to be enlarged and displayed in the video playback window;

acquiring a second image by clipping the first image based on the specified region, and the second image includes the specified region; and enlarging and displaying the second image on the transparent image layer.

The embodiment in FIG. 7 corresponds to a basic introduction to a terminal. The followings introduce the structure of the terminal in detail in the embodiment corresponding to FIG. 8.

Figure 8:
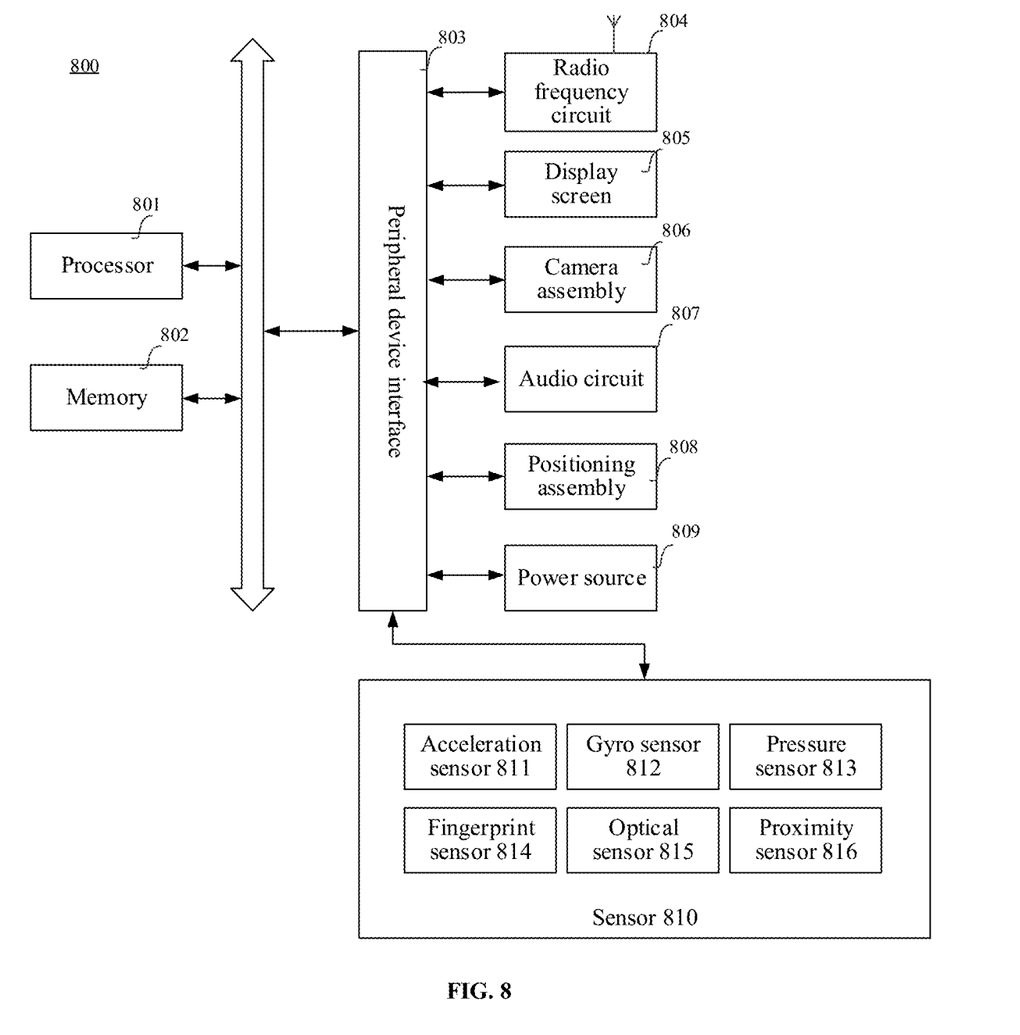
FIG. 8 is a schematic structural diagram of a terminal 800 according to an embodiment of the present disclosure.

FIG. 8 is a schematic structural diagram of a terminal 800 according to an embodiment of the present disclosure. The terminal 800 may be a smart mobile phone, a tablet computer, a moving picture experts group audio layer III (MP3) player, a moving picture experts group audio layer IV (MP4) player, a laptop, or a desk computer. The terminal 800 may also be referred to as a user equipment (UE), a portable terminal, a laptop terminal, a desk terminal, and the like.

Generally, the terminal 800 includes a processor 801 and a memory 802.

The processor 801 may include one or more processing cores, such as a 4-core processor and an 8-core processor. The processor 801 may be formed by at least one hardware of a digital signal processing (DSP), a field-programmable gate array (FPGA), or a programmable logic array (PLA). The processor 801 may further include a main processor and a coprocessor. The main processor is a processor to process the data in an awake state, and is further called a central processing unit (CPU). The coprocessor is a low-power-consumption processor to process the data in a standby state. In some embodiments, the processor 801 may be integrated with a graphics processing unit (GPU), and the GPU is configured to render and draw the content that needs to be displayed over a display screen. In some embodiments, the processor 801 may further include an artificial intelligence (AI) processor configured to process computational operations related to machine learning.

The memory 802 may include one or more non-temporary storage media, and the non-temporary storage media may be non-transitory. The memory 802 may further include a high-speed random-access memory, and a non-volatile memory, such as one or more disc storage devices and flash storage devices. In some embodiments, the non-transitory non-temporary storage medium in the memory 802 is configured to store at least one instruction. The at least one instruction, when executed by the processor 801, causes the processor to perform a method for processing a video including:

superimposing a transparent image layer on a video playback window;

acquiring a first image by capturing images from a video played in the video playback window in response to acquiring a specified region to be enlarged and displayed in the video playback window;

acquiring a second image by clipping the first image based on the specified region, and the second image includes the specified region; and enlarging and displaying the second image on the transparent image layer.

In some embodiments, the processor 801 is configured to:

acquire one first image by capturing images from the video for every preset time period;

acquire, each time one first image is acquired, one second image by clipping the one first image currently acquired based on the specified region; and update, each time one second image is acquired, the second image currently displayed on the transparent image layer to the one second image currently acquired or keep the second image currently displayed unchanged, based on the one second image currently acquired.

In some embodiments, the processor 801 is further configured to:

acquire a similarity degree between the second image currently acquired and the second image currently displayed; and update the second image currently displayed to the second image currently acquired in the case that the similarity degree is less than a preset threshold; or keep the second image currently displayed unchanged in the case that the similarity degree is greater than or equal to the preset threshold.

In some embodiments, the processor 801 is further configured to:

enable an enlarging function in response to receiving an enabling instruction of the enlarging function, and the enlarging function is configured to enlarge and display any region of the video in the video playback window.

In some embodiments, the processor 801 is further configured to:

disable an enlarging function in response to receiving a disabling instruction of the enlarging function, and the enlarging function is configured to enlarge and display any region of the video in the video playback window; and delete the transparent image layer.

In some embodiments, the processor 801 is further configured to:

play the video in the video playback window over a video player of a browser.

In some embodiments, a size of the transparent image layer is equal to a size of the video playback window, and a displayed size of the second image is equal to the size of the transparent image layer.

In some embodiments, the terminal 800 further optionally includes a peripheral device interface 803, and at least one peripheral device. The processor 801, the memory 802, and the peripheral device interface 803 may be connected via a bus or a signal line. Each of the at least one peripheral device may be connected to the peripheral device interface 803 via the bus, the signal line or a circuit board. Specifically, the peripheral device includes at least one of a radio frequency circuit 804, a display screen 805, a camera assembly 806, an audio circuit 807, a positioning assembly 808, or a power source 809.

The peripheral device interface 803 may be configured to connect at least one peripheral device associated with an input/output (I/O) to the processor 801 and the memory 802. In some embodiments, the processor 801, the memory 802 and the peripheral device interface 803 are integrated on a same chip or circuit board. In some embodiments, any one or two of the processor 801, the memory 802, and the peripheral device interface 803 may be implemented on a separate chip or circuit board, which is not limited in the embodiments.

The radio frequency circuit 804 is configured to receive and transmit a radio frequency (RF) signal, which is also referred to as an electromagnetic signal. The radio frequency circuit 804 is communicated with a communication network and other communication devices via the electromagnetic signal. The radio frequency circuit 804 converts the electrical signal into the electromagnetic signal for transmission, or converts the received electromagnetic signal into the electrical signal. In some embodiments, the radio frequency circuit 804 includes an antenna system, an RF transceiver, one or more amplifiers, a tuner, an oscillator, a digital signal processor, a codec chipset, a subscriber identity module card, and the like. The radio frequency circuit 804 may be communicated with other terminals via at least one wireless communication protocol. The wireless communication protocol includes, but is not limited to, a Metropolitan Area Network, various generations of mobile communication networks (2G, 3G, 4G, and 5G), a wireless local area network, and/or a wireless fidelity (Wi-Fi) network. In some embodiments, the RF circuit 804 may further include a near-field communication (NFC) related circuits, which is not limited in the present disclosure.

The display screen 805 is configured to display a user interface (UI). The UI may include graphics, text, icons, videos, and any combination thereof. In the case that the display screen 805 is a touch display screen, the display screen 805 further has the capacity to acquire touch signals on or over the surface of the display screen 805. The touch signal may be input into the processor 801 as a control signal to process. In this case, the display screen 805 may be further configured to provide a virtual button and/or a virtual keyboard, which are also referred to as a soft button and/or a soft keyboard. In some embodiments, the display screen 805 may be one, which is disposed on the front panel of the terminal 800. In some embodiments, the display screens 805 may be at least two, which are disposed on different surfaces of the terminal 800 or in a folded design. In some embodiments, the display screen 805 may be a flexible display screen disposed on a curved or folded surface of the terminal 800. Even the display screen 805 may be a non-rectangular irregular shape, that is, an irregular-shaped screen. The display screen 805 may be made of a liquid crystal display, and an organic light-emitting diode (OLED), and the like.

The camera assembly 806 is configured to capture images or videos. In some embodiments, the camera assembly 806 includes a front camera and a rear camera. Generally, the front camera is disposed on the front panel of the terminal, and the rear camera is disposed on the back of the terminal. In some embodiments, at least two rear cameras are disposed, and are at least one of a primary camera, a depth-of-field camera, a wide-angle camera, or a telephoto camera respectively, so as to realize a background blurring function achieved by fusion of the main camera and the depth-of-field camera, and realize panoramic shooting and virtual reality (VR) shooting or other fusion shooting functions achieved by fusion of the main camera and the wide-angle camera. In some embodiments, the camera assembly 806 may further include a flashlight. The flashlight may be a mono-color temperature flashlight or a two-color temperature flashlight. The two-color temperature flashlight is a combination of a warm flashlight and a cold flashlight and may be used for light compensation at different color temperatures.

The audio circuit 807 may include a microphone and a speaker. The microphone is configured to collect sound waves of users and environments, and convert the sound waves into electrical signals and input the electrical signals to the processor 801 to process, or input the electrical signals to the RF circuit 804 to achieve voice communication. For the purpose of stereo acquisition or noise reduction, there may be a plurality of microphones disposed at different positions of the terminal 800. The microphone may also be an array microphone or an omnidirectional acquisition microphone. The speaker is configured to convert the electrical signals from the processor 801 or the radio frequency circuit 804 into the sound waves. The speaker may be a conventional film speaker or a piezoelectric ceramic speaker. Where the speaker is the piezoelectric ceramic speaker, the electrical signal may be converted into not only human-audible sound waves but also the sound waves which are inaudible to humans for the purpose of ranging and the like. In some embodiments, the audio circuit 807 may further include a headphone jack.

The positioning assembly 808 is configured to locate the current geographic location of the terminal 800 to implement navigation or location based services (LBS). The positioning assembly 808 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 809 is configured to power up various components in the terminal 800. The power source 809 may be alternating current, direct current, a disposable battery, or a rechargeable battery. In the case that the power source 809 includes the rechargeable battery, the rechargeable battery may a wired rechargeable battery or a wireless rechargeable battery. The rechargeable battery may be further configured to support the fast charging technology.

In some embodiments, the terminal 800 further includes one or more sensors 810. The one or more sensors 810 include, but are not limited to, an acceleration sensor 811, a gyro sensor 812, a pressure sensor 813, a fingerprint sensor 814, an optical sensor 815, and a proximity sensor 816.

The acceleration sensor 811 may detect magnitudes of accelerations on three coordinate axes of a coordinate system based on the terminal 800. For example, the acceleration sensor 811 may be configured to detect assemblies of a gravitational acceleration on the three coordinate axes. The processor 801 may control the touch display screen 805 to display a user interface in a landscape view or a portrait view based on a gravity acceleration signal collected by the acceleration sensor 811. The acceleration sensor 811 may be further configured to collect motion data of a game or a user.

The gyro sensor 812 may detect a body direction and a rotation angle of the terminal 800, and may collect a 3D motion of the user on the terminal 800 in cooperation with the acceleration sensor 811. Based on the data collected by the gyro sensor 812, the processor 801 may achieve the following functions: motion sensing (such as changing the UI based on a tilt operation of a user), image stabilization during shooting, game control and inertial navigation.

The pressure sensor 813 may be disposed on a side frame of the terminal 800 and/or a lower layer of the display screen 805. In the case that the pressure sensor 813 is disposed on the side frame of the terminal 800, a holding signal of the user to the terminal 800 may be detected. The processor 801 may perform left-right hand recognition or quick operation based on the holding signal collected by the pressure sensor 813. In the case that the pressure sensor 813 is disposed on the lower layer of the display screen 805, the processor 801 controls an operable control on the UI based on pressure operation of the user on the display screen 805. The operable control includes at least one of a button control, a scroll bar control, an icon control, or a menu control.

The fingerprint sensor 814 is configured to collect a fingerprint of the user. The processor 801 identifies the identity of the user based on the fingerprint collected by the fingerprint sensor 814, or the fingerprint sensor 814 identifies the identity of the user based on the collected fingerprint. In the case that the identity of the user is identified as trusted, the processor 801 authorizes the user to perform related sensitive operations, such as unlocking the screen, viewing encrypted information, downloading software, paying, and changing settings. The fingerprint sensor 814 may be disposed on the front, back, or side of the terminal 800. In the case that the terminal 800 is provided with a physical button or a manufacturer Logo, the fingerprint sensor 814 may be integrated with the physical button or the manufacturer Logo.

The optical sensor 815 is configured to collect ambient light intensity. In one embodiment, the processor 801 may control the display brightness of the display screen 805 based on the ambient light intensity collected by the optical sensor 815. Specifically, in the case that the ambient light intensity is high, the display brightness of the display screen 805 is increased; and in the case that the ambient light intensity is low, the display brightness of the display screen 805 is decreased. In another embodiment, the processor 801 may further dynamically adjust shooting parameters of the camera assembly 806 based on the ambient light intensity collected by the optical sensor 815.

The proximity sensor 816, also referred to as a distance sensor, is usually disposed on the front panel of the terminal 800. The proximity sensor 816 is configured to collect a distance between the user and a front surface of the terminal 800. In one embodiment, in the case that the proximity sensor 816 detects that the distance between the user and the front surface of the terminal 800 becomes gradually smaller, the processor 801 controls the display screen 805 to switch from a screen-on state to a screen-off state. In the case that the proximity sensor 816 detects the distance between the user and the front surface of the terminal 800 gradually increases, the processor 801 controls the display screen 805 to switch from the screen-off state to the screen-on state.

It should be understood by those skilled in the art that the structure shown in FIG. 8 does not constitute a limitation to the terminal 800, and may include more or less components than those illustrated, or combine some components or adopt different components arrangements.

In some exemplary embodiment, a non-temporary storage medium storing at least one instruction is further provided, such as a memory storing at least one instruction. The at least one instruction, when executed by a processor, performs the method for processing the video according to the above embodiments. For example, the above non-transitory storage medium may be a read-only memory (ROM), a random-access memory (RAM), a compact disc read-only memory (CD-ROM), a magnetic tape, a floppy disc, an optical data storage device, or the like.

In the exemplary embodiments, a computer program product storing at least one instruction is further provided. The at least one instruction, when executed by a processor, causes the processor to perform the method for processing the video according to the above embodiments.

Those of ordinary skill in the art may understand that all or part of the processes in the above embodiments may be performed by a hardware, or by a program to instruct related hardware. The program may be stored in a non-temporary storage medium. The above non-temporary storage medium may be a read-only memory, a magnetic disk, an optical disk, or the like.

Described above are merely preferred embodiments of the present disclosure, which are not intended to limit the present disclosure. Any modifications, equivalent substitutions, improvements, and the like made within the spirit and principles of the present disclosure shall be included in the protection scope of the present disclosure.

What is claimed is:

1. A method for processing a video, comprising:
   superimposing a transparent image layer on a video playback window, wherein the video playback window is a window corresponding to a video player of a browser;
   acquiring a first image by capturing images from a video played in the video playback window in response to acquiring a drawn specified region to be enlarged and displayed in the video playback window;
   acquiring a second image by clipping the first image based on the specified region, wherein the second image comprises the specified region; and
   enlarging and displaying the second image on the transparent image layer; and
   wherein
   acquiring the first image by capturing images from the video played in the video playback window comprises:
   acquiring one first image by capturing images from the video for every preset time period;
   acquiring the second image by clipping the first image based on the specified region comprises:
   acquiring, each time one first image is acquired, one second image by clipping the one first image currently acquired based on the specified region; and
   enlarging and displaying the second image on the transparent image layer comprises:
   updating, each time one second image is acquired, the second image currently displayed on the transparent image layer to the one second image currently acquired or keeping the second image currently displayed unchanged, based on the one second image currently acquired.

2. The method according to claim 1, wherein updating the second image currently displayed on the transparent image layer to the second image currently acquired or keeping the second image currently displayed unchanged, based on the second image currently acquired comprises:
acquiring a similarity degree between the second image currently acquired and the second image currently displayed; and
updating the second image currently displayed to the second image currently acquired in the case that the similarity degree is less than a preset threshold; or
keeping the second image currently displayed unchanged in the case that the similarity degree is greater than or equal to the preset threshold.

3. The method according to claim 1, wherein prior to superimposing the transparent image layer on the video playback window, the method further comprises:
enabling an enlarging function in response to receiving an enabling instruction of the enlarging function, wherein the enlarging function is configured to enlarge and display any region of the video in the video playback window.

4. The method according to claim 1, wherein upon enlarging and displaying the second image on the transparent image layer, the method further comprises:
disabling an enlarging function in response to receiving a disabling instruction of the enlarging function, wherein the enlarging function is configured to enlarge and display any region of the video in the video playback window; and
deleting the transparent image layer.

5. The method according to claim 1, wherein prior to superimposing the transparent image layer on the video playback window, the method further comprises:
playing the video in the video playback window over the video player of the browser.

6. The method according to claim 1, wherein a size of the transparent image layer is equal to a size of the video playback window, and a displayed size of the second image is equal to the size of the transparent image layer.

7. A terminal, comprising: a processor and a memory configured to store at least one instruction, wherein the processor, when executing the at least one instruction, is caused to perform a method for processing a video comprising:
superimposing a transparent image layer on a video playback window, wherein the video playback window is a window corresponding to a video player of a browser;
acquiring a first image by capturing images from a video played in the video playback window in response to acquiring a drawn specified region to be enlarged and displayed in the video playback window;
acquiring a second image by clipping the first image based on the specified region, wherein the second image comprises the specified region; and
enlarging and displaying the second image on the transparent image layer; and
wherein the processor is configured to:
acquire one first image by capturing images from the video for every preset time period;
acquire, each time one first image is acquired, one second image by clipping the one first image currently acquired based on the specified region; and update, each time one second image is acquired, the second image currently displayed on the transparent image layer to the one second image currently acquired or keep the second image currently displayed unchanged, based on the one second image currently acquired.

8. The terminal according to claim 7, wherein the processor is configured to:
acquire a similarity degree between the second image currently acquired and the second image currently displayed; and
update the second image currently displayed to the second image currently acquired in the case that the similarity degree is less than a preset threshold; or
keep the second image currently displayed unchanged in the case that the similarity degree is greater than or equal to the preset threshold.

9. The terminal according to claim 7, wherein the processor is configured to:
enable an enlarging function in response to receiving an enabling instruction of the enlarging function, wherein the enlarging function is configured to enlarge and display any region of the video in the video playback window.

10. The terminal according to claim 7, wherein the processor is configured to:
disable an enlarging function in response to receiving a disabling instruction of the enlarging function, wherein the enlarging function is configured to enlarge and display any region of the video in the video playback window; and
delete the transparent image layer.

11. The terminal according to claim 7, wherein the processor is configured to:
play the video in the video playback window by the video player of the browser.

12. The terminal according to claim 7, wherein a size of the transparent image layer is equal to a size of the video playback window, and a displayed size of the second image is equal to the size of the transparent image layer.

13. A non-transitory storage medium storing at least one instruction, wherein the at least one instruction, when executed by a processor, causes the processor to perform a method for processing a video, wherein the method comprises:
superimposing a transparent image layer on a video playback window, wherein the video playback window is a window corresponding to a video player of a browser;
acquiring a first image by capturing images from a video played in the video playback window in response to acquiring a drawn specified region to be enlarged and displayed in the video playback window;
acquiring a second image by clipping the first image based on the specified region, wherein the second image comprises the specified region; and
enlarging and displaying the second image on the transparent image layer; and
wherein
acquiring the first image by capturing images from the video played in the video playback window comprises:
acquiring one first image by capturing images from the video for every preset time period;
acquiring the second image by clipping the first image based on the specified region comprises:

acquiring, each time one first image is acquired, one second image by clipping the one first image currently acquired based on the specified region; and enlarging and displaying the second image on the transparent image layer comprises:

updating, each time one second image is acquired, the second image currently displayed on the transparent image layer to the one second image currently acquired or keeping the second image currently displayed unchanged, based on the one second image currently acquired.

14. The non-transitory storage medium according to claim 13, wherein updating the second image currently displayed on the transparent image layer to the second image currently acquired or keeping the second image currently displayed unchanged, based on the second image currently acquired comprises:

acquiring a similarity degree between the second image currently acquired and the second image currently displayed; and updating the second image currently displayed to the second image currently acquired in the case that the similarity degree is less than a preset threshold; or keeping the second image currently displayed unchanged in the case that the similarity degree is greater than or equal to the preset threshold.

15. The non-transitory storage medium according to claim 13, wherein prior to superimposing the transparent image layer on the video playback window, the method further comprises:

enabling an enlarging function in response to receiving an enabling instruction of the enlarging function, wherein the enlarging function is configured to enlarge and display any region of the video in the video playback window.

16. The non-transitory storage medium according to claim 13, wherein upon enlarging and displaying the second image on the transparent image layer, the method further comprises:

disabling an enlarging function in response to receiving a disabling instruction of the enlarging function, wherein the enlarging function is configured to enlarge and display any region of the video in the video playback window; and deleting the transparent image layer.

17. The non-transitory storage medium according to claim 13, wherein prior to superimposing the transparent image layer on the video playback window, the method further comprises:

playing the video in the video playback window over the video player of the browser.

\* \* \* \* \*